Feb. 5, 1952     B. STOCKFLETH ET AL     2,584,511
INDICATOR BOARD
Filed March 22, 1948                            3 Sheets—Sheet 1
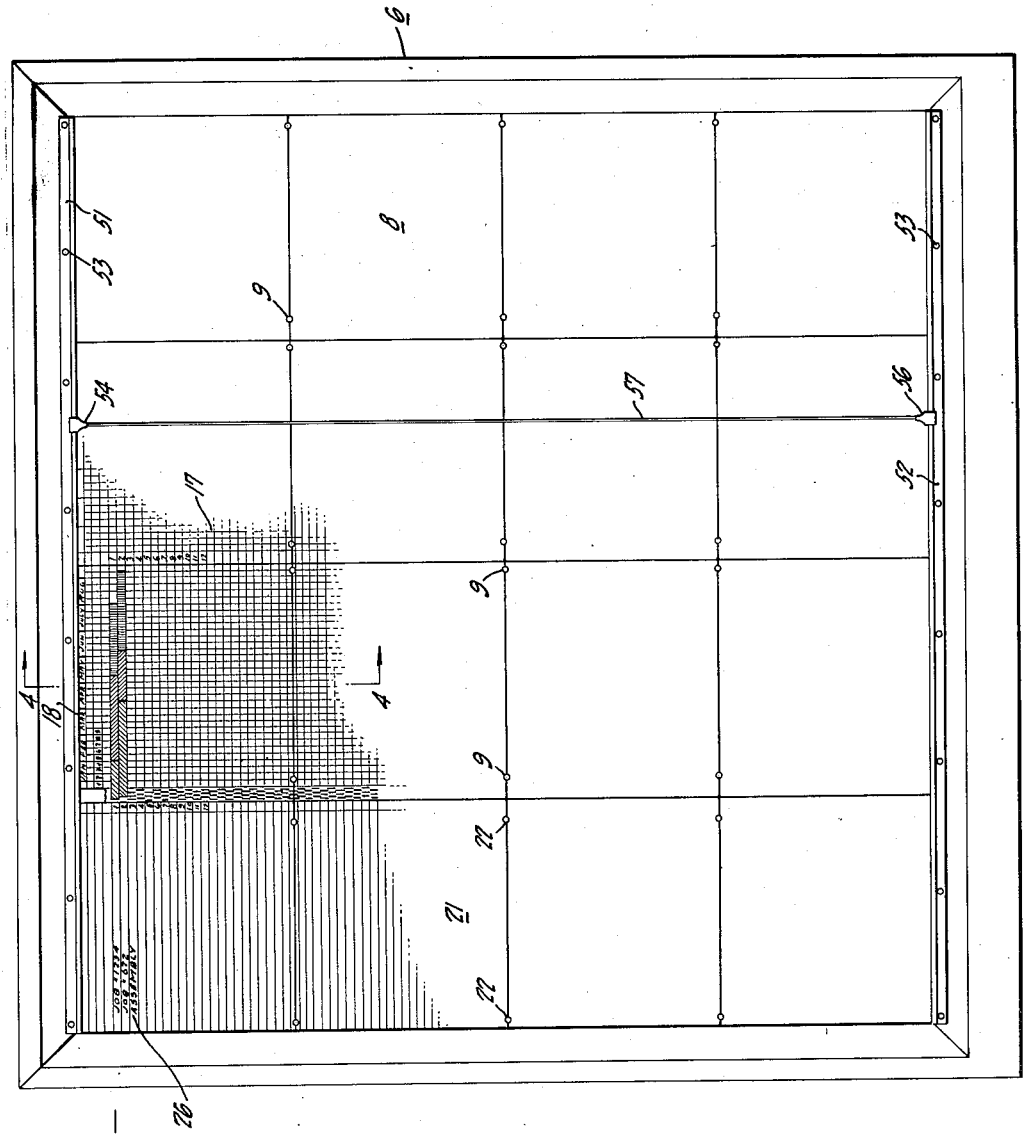
INVENTORS
Berger Stockfleth
LeRoy M. Osborne
BY Feb. 5, 1952   B. STOCKFLETH ET AL   2,584,511
INDICATOR BOARD
Filed March 22, 1948   3 Sheets-Sheet 2
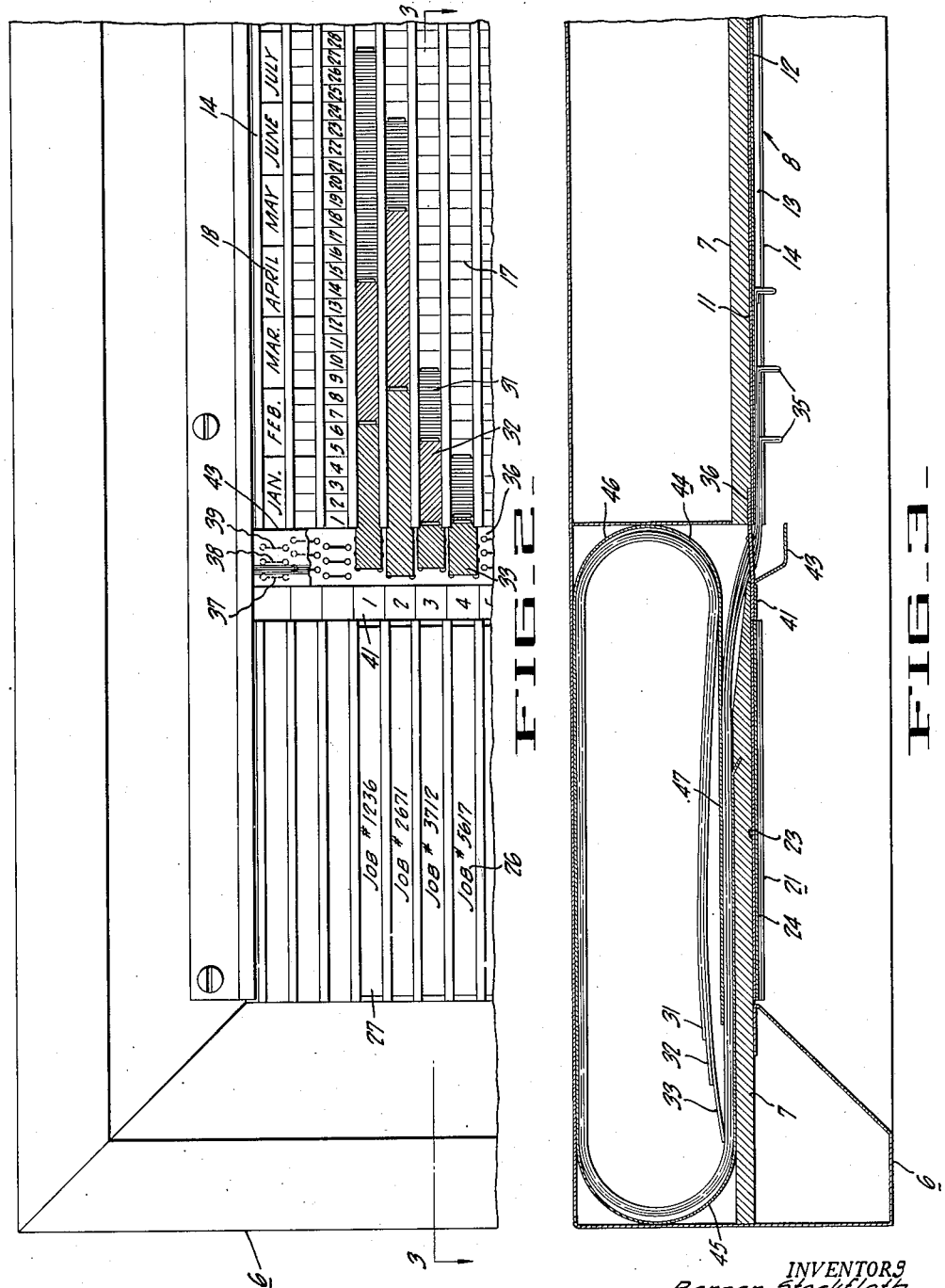
INVENTORS
Berger Stockfleth
LeRoy M. Osborne
BY
Mason Lothrop

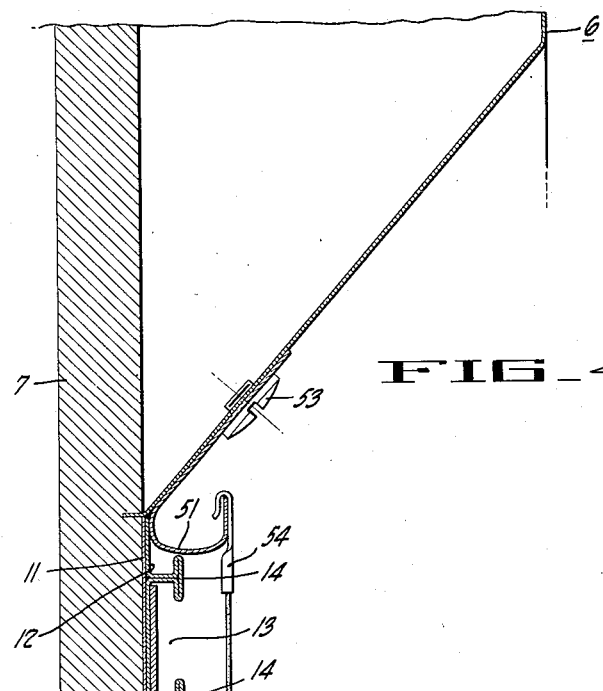

Patented Feb. 5, 1952

2,584,511

UNITED STATES PATENT OFFICE 2,584,511

INDICATOR BOARD

Berger Stockfleth, Paradise Cove, and Le Roy M. Osborne, San Rafael, Calif.

Application March 22, 1948, Serial No. 16,314

4 Claims. (Cl. 35—24)

Our invention relates to means for setting up, keeping track of and displaying various data, particularly data of the sort useful in production or other business processes and in which changes in indication are to be made and displayed from time to time. The general field of usefulness is not confined, however, to the one mentioned but is illustrated well in that environment and hence is so described herein. It is desirable in displaying data by means of movable indicia to provide means for including as much information as possible within a relatively limited space and also of making the indication quite clear and unmistakable. Furthermore, the mechanism must be relatively simple and capable of use over a protracted period. Also, the device must be rather flexible in its composition in order that different sets of data can be set up and displayed and manipulated from time to time. In addition it is advisable to provide a display or indicator board which can readily be set up in different sizes from time to time to indicate various quantities of data.

It is therefore an object of our invention to provide an improved indicator board.

Another object of our invention is to provide an indicator board in which the size of the board can be increased or decreased by units or multiples without major change in the board.

Another object of our invention is to provide an indicator board in which a number of different data can be displayed simultaneously.

An additional object of the invention is to provide an indicator board in which the indicators are readily superposable over each other so that a number of factors or qualities can be indicated and displayed in a single display zone.

A further object of the invention is to provide an indicator board in which the indicators are readily installed, interchanged and removed.

An additional object of the invention is to provide indicator means which are capable of long use without deterioration.

Another object of the invention is to provide indicators which are readily moved yet remain in position against accidental dislodgement.

An additional object of the invention is to provide an indicator board in which extensive linear indications may be afforded or displayed without requiring extensive storage space or complicated mechanism.

Other objects, together with the foregoing, are attained in the version of our indicator board described in the following description, and illustrated in the accompanying drawings, in which Figure 1 is a front elevation of one form of indicator board constructed in accordance with our invention.

Figure 2 is a view similar to Figure 1 but showing to an enlarged scale only the upper left hand corner of the indicator board.

Figure 3 is a cross section through the portion of the indicator board shown in Figure 2, the plane of section being indicated by the line 3—3 of Figure 2.

Figure 4 is a cross section to a greatly enlarged scale of a typical portion of the indicator board, the plane of section being indicated by the line 4—4 of Figure 1.

Figure 5 is a cross section similar to Figure 3 but showing a part of the tape mechanism to a greatly enlarged scale, other portions of the figure being broken away to reduce its size.

In its preferred form the indicator board of our invention includes one or more blocks adapted to be assembled to make up a composite field and affording a number of channels for the reception of flexible indicator tapes which are movable in the channels from and to a master storage compartment assembled with the blocks, there being provided an aligning device between the channels and the storage compartment frictionally engaging the tapes so that one or more of the indicator tapes can appropriately be led from the storage compartment through the aligning device into each channel and will be held thereby against accidental dislodgement.

While the indicator board of our invention can readily be incorporated in a number of different forms and sizes and arrangements in accordance with the particular kinds of data it is to display and to indicate from time to time, it has quite successfully been incorporated in the form shown in the drawings. In this form the indicator board is preferably inclusive of a peripheral frame 6 conveniently fabricated of a hollow metallic shape and is likewise inclusive of a base or a backing panel 7 to which the frame is appropriately secured for relatively permanent mounting. Depending upon the particular use to which the structure is put, we provide a number of blocks, generally designated 8, each of which is secured to the base 7 within the frame 6 to provide a display field. In the present instance there are twelve of the field blocks 8. Each of the blocks is mounted in place by fastenings 9 extending conveniently through it into the base 7 and holding it accurately in position. Since all of the blocks are substantially identical, a description of one of them applies equally to the others. Each of the blocks includes a backing plate 11 of metal or preferably of a rather stiff plastic material. Appropriately secured to the plate 11 is a superposed sheet 12, likewise preferably of metal or plastic material formed to provide a plurality of adjacent channels 13. These are separated by intervening guide walls 14, themselves enlarged and spread laterally to provide inturned flanges 16 so that the remaining groove between the inturned flanges is of lesser width than the remaining part of the channel.

The superposed sheet 12 can be integrally formed to provide a succession of channels and their intervening walls and flanges or the associated channels and intervening walls can be provided by separate channel-forming members assembled into juxtaposition as shown in the lower portion of Figure 4. Whichever method of fabrication is more convenient for the particular quality of device being produced is acceptable. In any case, there is afforded a structure in which the channel forming member 12 is of a transparent material such as an acetate plastic or a vinyl plastic. Furthermore, if and when the sheet 12 is made of a transparent plastic, it is of benefit to provide the plate 11 in such a way that before the superposed sheet 12 is associated therewith various indicia or markings are supplied to the subposed sheet. For example and as illustrated in Figure 1, the subposed plate 11 is provided with a number of vertical markings 17 imprinted thereon in addition to certain legends 18 which are set forth as typical.

The positioning of the legends and of the markings is such that they are clearly visible through the superposed sheet 12 and especially through the channels 13. Even though they may be partially obscured by the inturned flanges 16, there is sufficient visibility through them and especially through the remaining part of the channels to make the imprinted indicia on the subposed sheet adequately apparent. In the event such transparency is not needed, a metallic base plate 11 and a metallic superposed sheet 12 with appropriate channels can readily be provided. However, we much prefer the transparent construction. With the blocks 8 constructed and imprinted as described, and assembled on the base 7 in immediate juxtaposition, the channels 13 are arranged in horizontal alignment across the frame and extend parallel to each other. They extend from a position adjacent the top of the frame to a position adjacent the bottom thereof. The vertical lines 17 are disposed in alignment from the top to the bottom of the field and from near one side thereof to the other so that there is afforded a grid or plot effective for the display of information.

In order that the horizontal channels 13 may be provided with appropriate indices, the field blocks 8 are supplemented by indicia blocks 21 of the same general size and configuration. There are disposed on the base 7 by suitable fastenings 22 and are themselves comprised, as indicated in Figure 5, of a backing plate 23 adapted to be affixed immediately to the base and a superposed channel sheet 24 providing a number of flanged channels in line with the channels 13 and evenly spaced therewith. When the blocks 21 are mounted, there is a linear correspondence between the channels of the indicia blocks and the channels on the adjacent blocks 8. Display indicia 26 can be imprinted upon the backing plate 23 so that they are clearly visible through the transparent superposed sheet 24 or removable slips 27, as shown in Figure 2, can readily be inserted into the channels from the right hand end thereof. In either case there is provided in a column on the left-hand side of the field a space for the display of a number of different indicia 26 to characterize the corresponding horizontal channels 13 of the adjacent field blocks 8.

In accordance with our invention and in order to provide means for displaying an indicator or datum point for each of the channels at any convenient location along its length corresponding to the vertical columns 17, we preferably provide a plurality of tapes 31, 32 and 33 respectively, each of which is conveniently fabricated of a strip of colored translucent or transparent or opaque plastic or metal of a thickness readily to be received within the channels 13 beneath the flanges 16 and of a width slightly less than the interior width of each channel so that the strip is readily slidable therein. The thickness of the tape with respect to the channel is such that one or more tapes will fit in the channel and in some instances even with stationary indicator strips 34 between the tapes. The intermediate strips 34 are relatively wide and are held firmly in place by friction with the channel walls. The showing in Figure 4, exaggerates the clearances but indicates the relative cross-sectional sizes of the strips and tapes. In some instances, the outer end of each of the tapes is reduced in width to something slightly less than the width of the groove between the flanges 16 and is then upturned or upstruck to extend outwardly from the channel 13 between the flanges 16 to afford a grasping tab 35. The user, by grasping the tab 35 may advance or retract a tape, such as 33, within its channel. In other instances, the tape ends are not upturned but are left planar to avoid projections from the board. The tapes are then moved by an instrument extended between the flanges 16 and frictionally contacting them.

Since much of the time only part of the tapes need to be displayed, there is provided a means for storing the unused and undisplayed tape portions.

Interposed between the field blocks 21 and the adjacent field blocks 8 are thin strips 36 conveniently of plastic or metal of the same height as the various blocks but of a much lesser width being only sufficiently wide to accommodate a plurality of vertical slots 37, 38 and 39, for example. In order not to weaken the material of the strips 36 unduly the various slots are staggered in alternate groups. The edges of the slots are deflected in opposite directions to afford diagonal passageways through the strip. The ends of the passageways are somewhat enlarged to avoid splitting the material of the strips and to avoid lateral jamming of the tapes 31, 32 and 33. The central portions of the slot edges are close together and being of resilient material, act as friction brakes on the tapes passing therebetween. This frictional engagement is not so great as seriously to impede movement of the tapes by a user, but is effective to hold the tapes in selected positions against accidental dislodgment. In addition, the strips 36 are provided on the face with indicia strips 41 to afford additional indications with respect to the various transverse channels. The strips 36 are conveniently fastened to the blocks 21 and likewise are readily received in an undercut channel 42 in the adjacent ones of the blocks 8 so that they are readily assembled and disassembled therefrom but are held in firm position when in use. In some installations, but a single strip 36 serves for all of the blocks 8 and 21. Also in some instances, the strip 36 is overlaid by an opaque plate 43 to serve as a guard and datum edge.

In order to accommodate the various lengths of tape which pass through the inclined friction slots 37, 38 and 39, there is provided within the general framework 6 behind the blocks 21 a generally elongated and flattened cylindrical container 44 having rounded ends 45 and 46. The interior periphery of the container 44 is therefore smoothly defined and is of a convenient length with respect to the size of the board and the length of the individual tapes. In passing through the inclined slots, for example through the slot 39, a tape extends into the container 44, and being deformable, is turned by the outwardly curved end 45 thereof. The tape then proceeds to return on the inside of the container 44 until it approaches the curved end 46 whereupon it is again reversed in direction and proceeds in the original direction parallel to itself along an overlapping portion 47 of the container. If necessary, the tape turns upon itself again around the inside of the return 45 on top or alongside of the tape previously there until virtually its entire length is in the container 44.

As the user withdraws the tape from the container 44, he advances it along the channel 13 until the tape extends the full width of all of the blocks within the frame 6. Since a plurality of apertures 37, 38 and 39 are provided and since the channels 13 are several multiples of a tape thickness in depth, one or a number of tapes, as shown in Figure 4 especially, can be utilized in any single channel. The multiple tapes conveniently are of different colors and can be advanced to different positions in each channel in order to afford various data indications with respect to the field background and to each other.

As shown in Figure 1, the adjacent tapes are overlapped in different amounts so that there are several indications for each channel. Preferably, even though colored, the tapes are transparent so that indicia beneath them can be discerned. If the tapes are opaque, then the position of the end of the tape is indicative of a particular factor. Further, the tapes themselves can carry indicia and can be left relatively stationary or can be moved to afford even further indications. Since there are multiple tapes in each of the channels or for each of the channels and since a large number of channels are available, the amount of information that can be displayed on our indicator board is several times that which can normally be displayed in the same general area. Furthermore, the tapes can be entirely removed from the board or when returned are readily slid into selected position. They retain their established position against accidental dislodgment especially because of the frictional relationship between the tapes and the walls of their slots 37, 38 and 39. The unused tape parts do not extend beyond any part of the display at any time so that there is no distracting or false indication from unconcealed parts of the tapes.

In addition, in order to afford an easily recognizable datum point for the entire height of the board, we provide on the frame 6 a pair of rails 51 and 52 held by fastenings 53 in parallel relationship at the top and bottom of the field blocks 8. The rails are engaged by a top hook 54 and a bottom hook 56 together supporting a datum wire 57 arranged just to clear the tabs 35, if tabs are used, and to be close to the indicia on the board and to the tapes. A clear indicator or vertical rule corresponding to the vertical lines 17 is thus provided for movement from place to place across the board at the user's option.

The indicator board of our invention in use has the background so imprinted or otherwise marked as to provide appropriate datum points and designations while the panels 21 are provided with permanent or movable indications or designations corresponding to the various horizontal channels. The compartment or container 44 is provided with one or more superposed tapes arranged to emerge with some frictional restraint through the apertures 37, 38 and 39 so that one or more tapes are provided and positioned for some or all of the channels. By moving the individual tapes with respect to each channel, by moving the tapes with respect to each other, and in addition by utilizing the datum indicator 57, a user may set up various data on the indicator board and an observer may grasp its significance with great clarity and ease.

The size of the board can be varied from time to time by removing field blocks 8 or adding others thereto and making corresponding changes in the base 7 and frame 6 while the indicia blocks 21 can be removed or added to as desired. If more than three tapes, for example, are to be utilized in any one channel, additional friction brake strips 36 can be placed in the frame side by side and tapes of sufficient thinness can be utilized. There is consequently provided in accordance with our invention a flexible, versatile and reliable indicator board effective to receive and display a wide variety of data.

We claim:

1. An indicator board comprising a field made up of a plurality of blocks, each block having a plurality of parallel channels extending thereacross, said blocks being arranged with corresponding channels in adjacent blocks in longitudinal alignment with each other to provide a plurality of continuous parallel channels extending across said field, and flexible tapes slidably received in said channels, each of said blocks being individually removable whereby the size of said field may be varied.

2. An indicator board comprising a plurality of parallel channels, tapes slidable in said channels, a storage compartment for said tapes adjacent an end of said channels, each of said tapes extending through a slot in a wall of said compartment, means directing said tape along the inner surface of said wall, said compartment having smoothly curved inner surfaces to direct an end of said tape around the inner periphery thereof, and means overlying but spaced from said slot to direct the inner end of said tape therepast and generally parallel to said wall.

3. An indicator board comprising a plurality of parallel channels adapted to receive tapes for sliding movement in said channels, walls defining a storage compartment for said tapes disposed adjacent one end of said channels, one of said walls being pierced to provide a series of separate slots adjacent said end of each of said channels and in alignment therewith, alternate series of slots being different distances from the end of their respective channels to dispose each series of slots in staggered relation to the series of slots in alignment with the next adjacent channels.

4. An indicator board comprising a plurality of parallel channels, tapes slidable in said channels with a predetermined friction, a storage compartment for said tapes adjacent an end of said channels, each of said tapes extending through a slot in a wall of said compartment, said slot having resilient edge portions biased to engage opposite faces of a tape passing therethrough with more than said predetermined friction, said resilient edge portions being directed in opposite directions out of the plane of said wall to define an oblique passageway in the path of a tape directed along the surface of said wall.

BERGER STOCKFLETH.
LE ROY M. OSBORNE.

REFERENCES CITED

The following references are of record in the file of this patent:

UNITED STATES PATENTS

| Number | Name | Date |
|---|---|---|
| 1,558,920 | Rech | Oct. 27, 1925 |
| 1,580,674 | Pamperl | Apr. 13, 1926 |
| 1,623,216 | Szepesi | Apr. 5, 1927 |
| 1,737,657 | Hoffmann | Dec. 3, 1929 |
| 2,070,431 | Hoppmann | Feb. 9, 1937 |
| 2,118,675 | Jackson | May 24, 1938 |
| 2,168,443 | Johnson | Aug. 8, 1939 |
| 2,385,347 | Chadwell | Sept. 25, 1945 |

FOREIGN PATENTS

| Number | Country | Date |
|---|---|---|
| 402,478 | Great Britain | Dec. 7, 1933 |
| 607,177 | Great Britain | Aug. 26, 1944 |